United States Patent
Lakshmanan et al.

(10) Patent No.: US 8,756,171 B2
(45) Date of Patent: Jun. 17, 2014

(54) GENERATING PREDICTIONS FROM A PROBABILISTIC PROCESS MODEL

(75) Inventors: Geetika Tewari Lakshmanan, Winchester, MA (US); Yurdaer Nezihi Doganata, Chestnut Ridge, NY (US); Davood Shamsi, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/160,896

(22) Filed: Jun. 15, 2011

(65) Prior Publication Data

US 2012/0323827 A1  Dec. 20, 2012

(51) Int. Cl.
*G06N 7/00* (2006.01)
*G06Q 10/06* (2012.01)

(52) U.S. Cl.
CPC ............ *G06N 7/005* (2013.01); *G06Q 10/0631* (2013.01); *G06Q 10/06312* (2013.01)
USPC ......................................................... 706/12

(58) Field of Classification Search
CPC .............. G06N 7/005; G06Q 10/0631; G06Q 10/06312
See application file for complete search history.

(56) References Cited

U.S. PATENT DOCUMENTS

| | | | |
|---|---|---|---|
| 6,009,452 A * | 12/1999 | Horvitz | 718/102 |
| 7,111,177 B1 * | 9/2006 | Chauvel et al. | 713/300 |
| 7,480,913 B2 * | 1/2009 | Buco et al. | 718/105 |
| 7,849,044 B2 | 12/2010 | Nelken | |
| 2008/0005744 A1 * | 1/2008 | Buco et al. | 718/105 |
| 2008/0184250 A1 * | 7/2008 | Hamadi et al. | 718/104 |
| 2008/0222640 A1 * | 9/2008 | Daly et al. | 718/103 |
| 2010/0106603 A1 * | 4/2010 | Dey et al. | 705/14.63 |
| 2012/0101974 A1 * | 4/2012 | Duan et al. | 706/52 |

OTHER PUBLICATIONS

Zhao et al, Temporal Workflow Management in a Claim Handling System, 1999.*
Lakshmanan et al., Predictive Analytics for Semi-structured Case Oriented Business Processes. First Workshop on Traceability and Compliance of Semi-structured Processes, Business Process Management Conference (BPM'10), (Sep. 2010).
Buco et al., Utility computing SLA management based upon business objectives. IBM Systems Journal 43(1): 159-178 (Jan. 2004).

* cited by examiner

*Primary Examiner* — Jeffrey A Gaffin
*Assistant Examiner* — Mikayla Chubb
(74) *Attorney, Agent, or Firm* — F. Chau & Associates, LLC; William J. Stock, Esq.

(57) ABSTRACT

A method for predictive analytics in a semi-structured process including updating, iteratively, at least one probability of a probabilistic process model based on a completed task, wherein updating the at least one probability of the probabilistic process model includes receiving the probabilistic process model associated with a todo list including a plurality of tasks of the semi-structured process, defining a cost of each of the plurality of tasks, prioritizing the plurality of tasks according to the costs, and recommending a next task from the todo list according to a prioritization

25 Claims, 5 Drawing Sheets

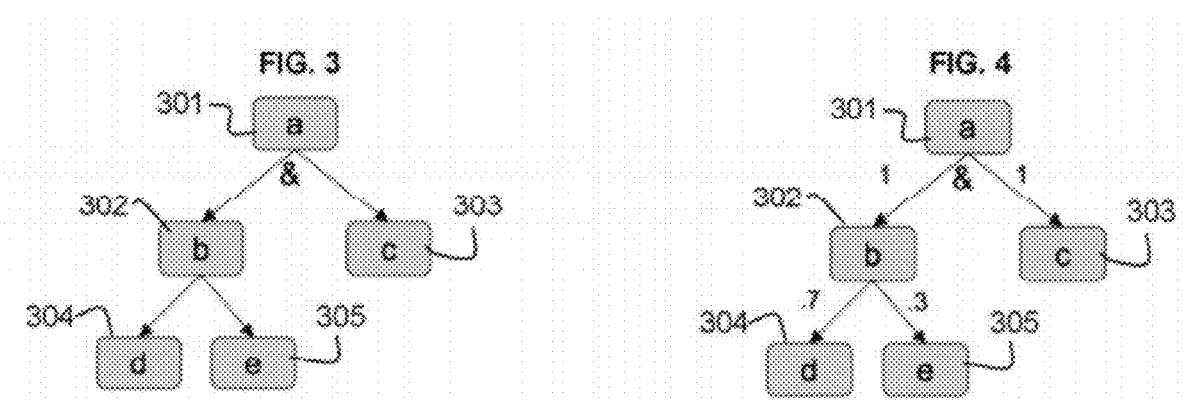
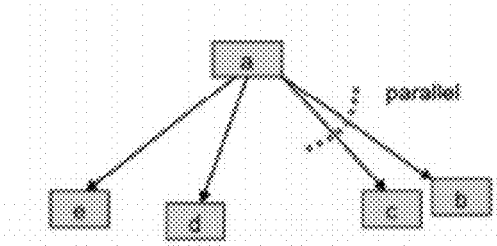
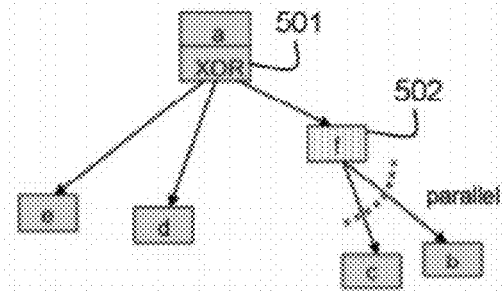
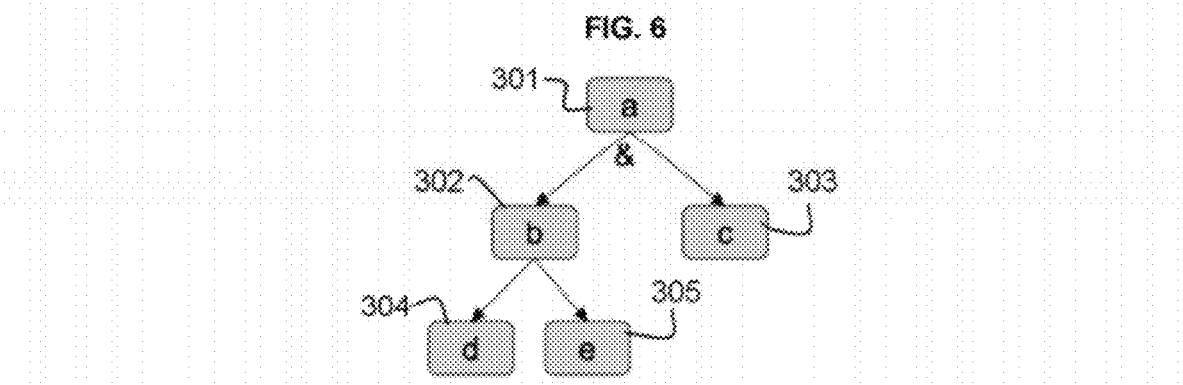

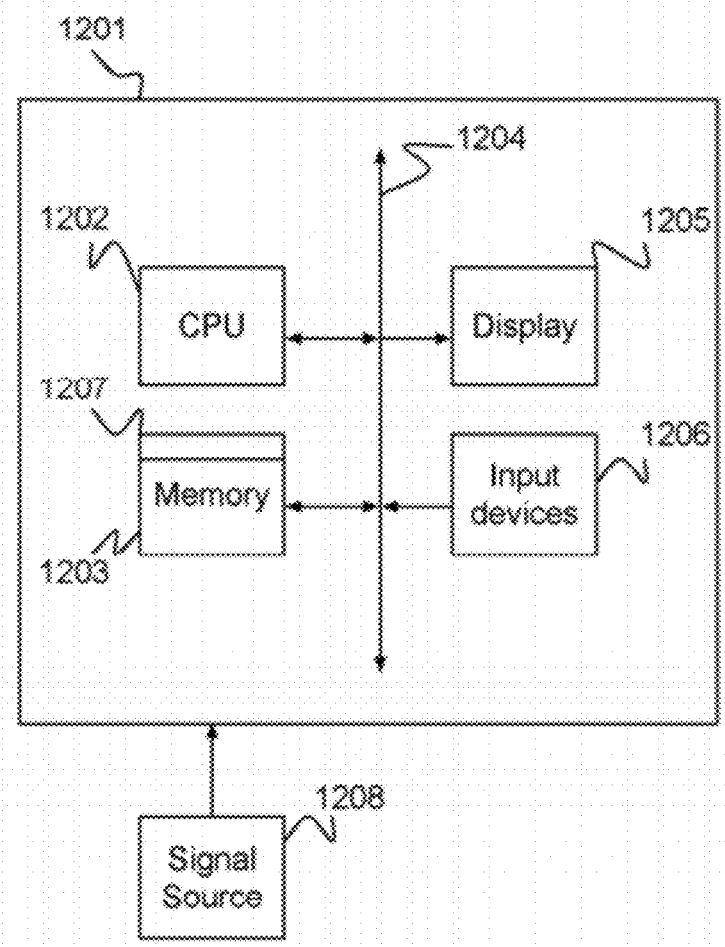

GENERATING PREDICTIONS FROM A PROBABILISTIC PROCESS MODEL

BACKGROUND OF THE INVENTION

1. Technical Field

The present disclosure generally relates to predictive analytics for document content driven processes and more particularly to generating predictions from a probabilistic process model.

2. Discussion of Related Art

Semi-structured processes are emerging in industries such as government, insurance, banking and healthcare. These business or scientific processes depart from the traditional structured and sequential predefined processes. The lifecycle of semi-structured processes is not fully driven by a formal process model. While an informal description of the process may be available in the form of a process graph, flow chart or an abstract state diagram, the execution of a semi-structured process is not completely controlled by a central entity, such as a workflow engine. Case oriented processes are an example of semi-structured business processes.

Case executions within a process are typically non-deterministic, driven by human decision making, and the contents of documents. In particular there is no single formal process model that drives the lifecycle of case-oriented business processes. The lifecycle of semi-structured processes is not fully driven by a formal process model.

Assigning tasks to employees and other resources while minimizing the total penalties belongs to a class of NP-hard problems. Optimization for task scheduling is a well-studied problem. For example, task scheduling for people involved in Service Level Agreements (SLAs) has been studied in detail in the past. Known schedulers seek to minimize a sum of the exposed business impact, based on absolute or relative completion times. The scheduler assigns tasks to service personnel on the basis of a job-based task management model. These problems focus on scheduling tasks between multiple people while optimizing an objective function such as time to complete a task that is not influenced by the properties of the current business process instance.

According to an embodiment of the present disclosure, a need exists for a method of generating predictions from a probabilistic process model.

BRIEF SUMMARY

According to an embodiment of the present disclosure, a computer implemented iterative method for predictive analytics in a semi-structured process includes updating, iteratively, at least one probability of a probabilistic process model based on a completed task, wherein updating the at least one probability of the probabilistic process model includes defining a cost of each of a plurality of tasks associated with the probabilistic process model, prioritizing the plurality of tasks according to the costs, and recommending a next task from the todo list according to a prioritization.

According to an embodiment of the present disclosure, a method for predictive analytics in a semi-structured process includes updating, iteratively, at least one probability of a probabilistic process model based on a completed task, wherein updating the at least one probability of the probabilistic process model includes receiving the probabilistic process model associated with a todo list including a plurality of tasks of the semi-structured process, defining a cost of each of the plurality of tasks, prioritizing the plurality of tasks according to the costs, and recommending a next task from the todo list according to a prioritization.

According to an embodiment of the present disclosure, a method for predictive analytics in a semi-structured process includes updating a probabilistic process model associated with a plurality of tasks upon a task of the plurality of tasks being completed, wherein the completed task is removed from the plurality of tasks of the semi-structured process, defining costs of remaining tasks of the plurality of tasks based on a prediction of an updated probabilistic process model, prioritizing that remaining tasks according to the costs, and recommending a next task from the remaining tasks according to a prioritization.

According to an embodiment of the present disclosure, a method for predictive analytics in a semi-structured process includes updating, iteratively, at least one probability of a probabilistic process model based on a completed task, wherein updating the at least one probability of the probabilistic process model includes receiving the probabilistic process model associated with a todo list including a plurality of tasks of the semi-structured process, defining a cost of each of the plurality of tasks, prioritizing the plurality of tasks according to the costs, determining an exception to the todo list, and recommending a task from a general list according to the exception.

BRIEF DESCRIPTION OF THE SEVERAL VIEWS OF THE DRAWINGS

Preferred embodiments of the present disclosure will be described below in more detail, with reference to the accompanying drawings:

FIG. 3 is a process model according to an embodiment of the present disclosure;

FIG. 4 is a Probabilistic Process Model according to an embodiment of the present disclosure;

FIGS. 5A-B illustrate a determination of the type of the input and output gates types in a process graph according to an embodiment of the present disclosure;

FIG. 6 is an exemplary partitioning of the process model of FIG. 3 into subsets according to an embodiment of the present disclosure;

FIG. 12 is a diagram of a computer system for implementing an end-to-end prediction according to an embodiment of the present disclosure.

DETAILED DESCRIPTION

Figure 1:
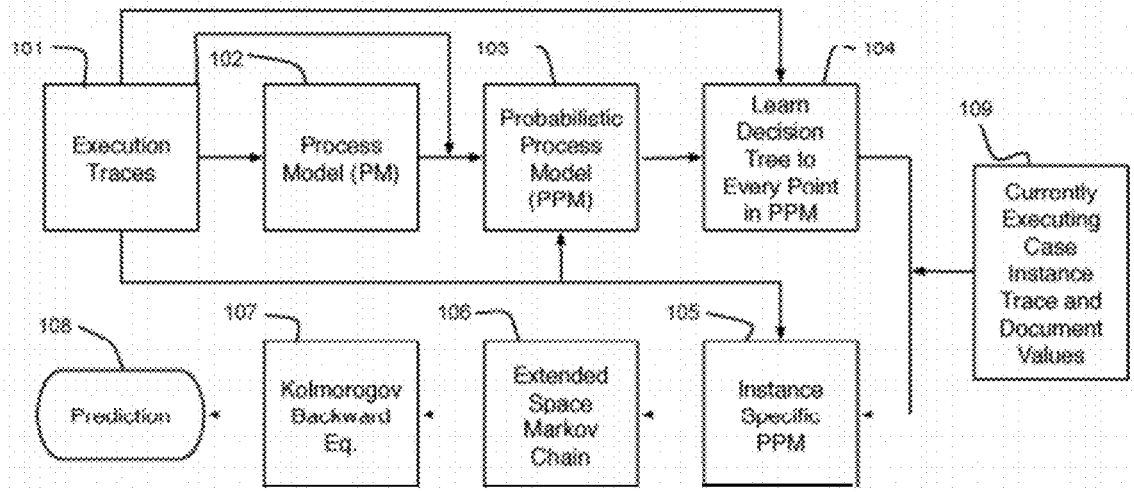
FIG. 1 is a flow diagram of a method for predicting outcomes at any stage of a content driven process instance execution according to an embodiment of the present disclosure.

According to an embodiment of the present disclosure, predictions may be generated from a probabilistic process model (PPM) mined from case instances of semi-structured (or a non-structured) business processes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

According to an embodiment of the present disclosure, a PPM is a data structure that represents a mined process model with probabilities on each edge and enables understanding of the execution of cases and predictions for the likelihood of different outcomes in the data structure. A PPM may be mined from case instance traces. The edges of the PPM contain transition probabilities between two given tasks in the case. Furthermore, an instance specific PPM contains transition probabilities that may be updated to reflect a likelihood of those transitions given the document contents available at decision nodes in a given case instance. The document content may include a document content value as an attribute in an instance of the process. Decision nodes are nodes in the process where the decision splits into multiple different outgoing paths. Using an instance specific PPM, one can compute the likelihood of outcomes in a given process instance. Assuming that some initial meta-data has been provided that marks final outcomes of the case as desired or undesired. This meta-data may be supplied in the form of numerical constants, such as 1 for a desired outcome, and 0 for an undesired outcome, and 0.5 for a neutral outcome. By mining an instance specific PPM from the current case instance data, and previously executed case instance traces that may be available, it is possible to predict the likelihood of final outcomes.

According to an embodiment of the present disclosure, given estimates of a likelihood of final outcomes, costs of executing each task may be estimated in several ways. An exemplary method for assigning the cost of executing a task may include a pre-classification of tasks in a todo list. A todo list is a list of one or more tasks to be completed in a semi-structured business process. The order in which the tasks should be completed is not fixed. Tasks can be added or removed from the list at any time during the execution of the business process.

Assuming that the tasks have been classified by meta-data into categories. For example, the tasks may be classified as:

a) Remedial Actions including for example, setting up a meeting with manager, setting up a review with an auditor, and a pause case processing.

b) Continue Processing Actions including subsequent steps in a progression of a case.

c) More Paperwork Actions including for example, checking forms signed by an employee, checking an employee's background and case history, making additional notes on the case, and checking employee's paperwork such as insurance coverage and social security ID.

Each task in a todo list may be assigned in a category. A mapping is created between outcomes and tasks. The mapping may be used to assign costs. If the likelihood of undesired outcomes is high, e.g., greater than a threshold, then costs of tasks that are classified as Remedial Actions are set to high, and costs of tasks that are classified as Continue Processing Actions are set to low and costs of tasks that are classified as More Paperwork Actions are set as medium. High, medium, low value ranges may be determined and configured by the user.

The probabilistic process model may be associated with more than one list. For example, a todo list may include a plurality of tasks to be completed by a case-worker and a list including general tasks for handling exceptions to the todo list, for example, remedial actions that are not part of the todo list.

It should be appreciated that these techniques can be applied at any state of the execution of a given case. Thus, a case-worker may prioritize tasks of a todo list at any state of execution of the case.

It should also be appreciated that the case-worker need not execute each task in the todo list. The case worker may skip a task based on document contents.

According to an embodiment of the present disclosure, a PPM may be built and mined for prediction probabilities. The probabilities may be updated with each incoming case trace. This provides a dynamic and adaptive representation of a process that is well suited to case oriented semi-structured processes and that is amenable to incremental updates. A process model (PM) component of the PPM captures the logical structure in the process such as loops, parallelism, joins and splits. The probabilities in the PPM provide guidance on the likelihood and strength of transitions between process states that can be leveraged for predictions. The probabilities in the PPM can be updated in many different ways including using Ant Colony Optimization techniques that have been demonstrated to be useful for stochastic time-varying problems. Further, new PPMs may be mined to adapt to structural changes in the process.

The PPM is a combination of a PM and a probabilistic graph (PG).

Figure 2:
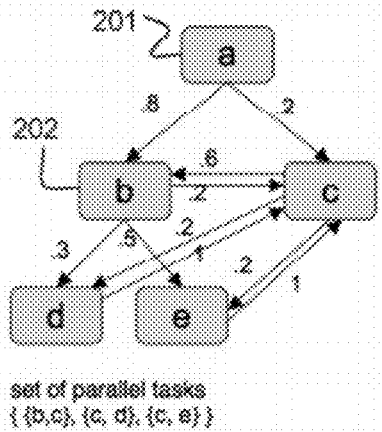
FIG. 2 is a probabilistic graph according to an embodiment of the present disclosure.

The probabilistic graph is a directional graph with tasks as nodes. There is an edge from node "a" to node "b" if sequence "ab" is observed in the past event logs. At each node, transition probabilities are assigned to all outgoing edges. Transition probabilities at each node are summed up to one. In view of the foregoing, the probabilistic graph describes probabilities of going from one task to another task. However, it does not capture the structure of the process. For example, if there are parallel tasks in the process model, they are shown as loops of length 2. In FIG. 2 tasks "b" and "c" (201 and 202) are parallel, but it cannot be observed from the PG; FIG. 3 is the underlying process model. Extra edges in the probabilistic graph cause impossible paths in the process model. For example, since "a" and "b" are parallel, both should be executed in any case. However, path "abe" is a valid path in the PG.

The process model describes the structural behavior of the process. The process model describes parallelism (AND-split, AND-join), sequential paths (XOR), etc. FIG. 3 is a process model obtained from the same event logs as the mined probabilistic graph of FIG. 2. In FIG. 3, the and-sign (&) at the output of task "a" 301 that means task "b" 302 and task "c" 303 are parallel. However, task "d" 304 and task "e" 305 are not parallel (they are exclusive) and after performing task "b", one of them is performed. Formally the process model may be defined as follows:

A directed graph G(V,E) such that there is a start node "i" with no incoming edge and there is an end nodes "e" with no outgoing edge. Each node has input gate and output gate. The input and output gates can be XOR or AND gates.

In view of the foregoing, the PPM is a combination of a process model and probabilistic graph such that transition probabilities are added to the edges of the process model. For example in FIG. 4, after task "b" 302, task "e" 305 is done with probability 0.3 and task "d" 304 is done with probability 0.7. Note that at task "a" 301, there are two parallel paths without any choice. Thus, both edges are marked with probability of 1.

The PPM may be obtained from either a probabilistic graph or process model. In the case of obtaining the PPM from a probabilistic graph, parallel edges and structures of the process model are detected. In the case of obtaining the PPM from a process model, transition probabilities are added. That is, the structure of the process (e.g., parallelism) is detected and equipped with transition probabilities within the process model. Process mining may be used for both cases.

According to an embodiment of the present disclosure and referring to FIG. 1, given correlated process execution logs or traces of a semi-structured process 101, a process model 102 corresponding to process the may be mined. A semi-structured business process includes structured tasks that follow a required order, and unstructured tasks. Execution of the unstructured tasks may require human action or decisions. A method for mining the process model may be considered in two phases. In a first phase parallel tasks are detected using stochastic characterizations of loops and parallel tasks. In a second phase, invisible gates are recursively detected in the input and the output of the tasks.

According to an embodiment of the present disclosure, it may be assumed that a provenance-based system collects case history from diverse sources and provides integrated, correlated case instance traces where each trace represents an end-to-end execution of a single case including contents of documents accessed or modified or written by each activity in the trace. The correlated case instance execution traces are used as input of predictive analytics for case-oriented semi-structured processes. It should be understood that methods described herein are applicable to partial traces in cases where end-to-end execution data is not available. For example, in a currently executing business process, the outcome of the business process can be predicted based on the contents of documents currently available and known thus far, as well as traces of previous execution instances of the business process. In particular underlying methods, such as decision trees and Markov Chain rule, do not require all data variables to be initialized in order to make a prediction for the business process instance that is currently executing.

Provenance includes the capture and management of the lineage of business artifacts to discover functional, organizational, data and resource aspects of a business. Provenance technology includes the automatic discovery of what actually has happened during a process execution by collecting, correlating and analyzing operational data. The provenance technology includes the identification of data collection points that generate data salient to operational aspect of the process. This requires understanding a process context. Information and documentation about operations, process execution platforms, and models help determine the relevant probing points. A generic data model that supports different aspects of business needs to be in place to in order to utilize the operational data. The collected data is correlated and put into the context in order to have an integrated view.

Referring to the correlated traces, let T be the set of all tasks in the logs and t be a trace in the log; e.g., t is a finite sequence of tasks in T. The i-th element of the trace t is denoted by $t_i$. The set of all traces is represented by L.

A directed graph G(V,E) is constructed based on the observed traces 101. Set of nodes, V, is defined to be set of all tasks in the logs, T; and there is an edge between tasks "a" and "b" if there is a trace t in T such that $t_i$=a and $t_{i+1}$=b. The constructed graph, G, is called a process graph, which provides information about the relationships between various tasks in the process.

Once a correlation has been determined it may be used to predict the outcome of an activity instance based on the contents of the documents it has access to. The probabilistic graph is used automatically to determine the decision nodes (e.g., activities where decisions are made) in a case management scenario, and use the decision tree method to learn the circumstances under which document contents accessed by a particular decision point would lead to different outcomes.

For an end-to-end prediction, given a probabilistic graph, document content is determined for each trace, decision points in the probabilistic graph are deter mined, prediction target nodes in the probabilistic graph are determined, and if a valid prediction target is determined, predictions are made on current document contents. A valid node has an edge connected to the decision node in the probabilistic graph. If a probabilistic graph is determined to be available, transition probabilities may be updated prior to determining values of the document data.

If there is no parallel task, the process graph can precisely describe the structure of the process model 102. However, existence of parallel tasks adds a dimension of complexity in the determination of a correct process model 102. When tasks "a" and "b" are parallel, they can be executed in any order. Thus, it is likely that an edge exists from "a" to "b" and another edge from "b" to "a". Typically there is a bi-direction edge between two parallel tasks in the process graph while there is no causal relationship between two tasks.

Loops having a length=2 are another situation that bi-directional edges arise. Consider a 2-loop between tasks "c" and "d". After executing task "c", task "d" may be executed or vice versa. Again tasks "c" and "d" may appear in traces in any order and there will be a bi-directional edge between "c" and "d". However, the bi-directional edge here is a valid edge and it is part of the process model.

One challenge in process mining is to differentiate between two parallel tasks and a loop of length two (both introduce bi-directional edges in the process graph). A stochastic characterization of a loop and parallel task may be used to determine a bi-directional edge is a 2-loop or it is caused by two parallel tasks (and it should be deleted). In particular, the following probabilities may be utilized:

x=P (task "a" is observed in a trace after "b" is observed|task "b" is observed)

y=P (ask "a" is observed in a trace after "a" and "b" are observed|tasks "b" and "a" are observed)

z=P (task "b" is observed in a trace after "a" is observed|task "a" is observed)

w=P (ask "b" is observed in a trace after "a" and "b" are observed|tasks "b" and "a" are observed)

"x" is the probability of seeing "a" after "b"; if "a" and "b" are parallel then this probability is 1 and if they are in a 2-loop "x" is a real value between 0 and 1. The second number, "y", is the probability of observing "a" after observing "a" and "b". If "a" and "b" are parallel (and there are not in a bigger loop) then "y" should be zero; otherwise, y should be equal to x. In other words, "x" and "y" are close when "a" and "b" are in a loop. "z" and "w" have similar interpretation. The following exemplary measure may be used to determine how close these probabilities are:

$$g = x/y + y/x + z/w + w/z$$

If "x=y" and "z=w" then g is the minimum possible value (e.g., 4). A threshold "h" may be defined such that if "g≥h" then "a" and "b" are parallel and g<h they are in a 2-loop. Note that in ideal setting, when the two tasks are parallel, g is infinity and when they are constructing a loop "g=4".

The above for probabilities can be approximated with the empirical values from the trace logs, L.

x≈#(task "a" is observed in all traces after task "b" is observed)/#(task "b" is observed)

y≈#(task "a" is observed in all traces after tasks "b" and "a" are observed)/#(after tasks "b" and "a" are observed)

z≈#(task "b" is observed in all traces after task "a" is observed)/#(task "b" is observed)

w≈#(task "b" is observed in all traces after tasks "b" and "a" are observed)/#(after tasks "b" and "a" are observed)

Knowing the parallel tasks in the process graph, the type of the input and output gates types in the process graph are determined. If a node has two outgoing edges and the corresponding tasks are parallel, then the output gate is "AND". Similarly, when two tasks corresponding to outgoing edges are not parallel, the output type may be set as "XOR" as shown in FIG. 5A-B. However, the outgoing edges may have a more complex structure. For example, consider the outgoing edges of node "a" in FIG. 5A. After executing task "a", then task "e", OR ELSE task "d", or ELSE tasks "c" and "b" in parallel should be executed. It is not possible to represent the outputs of tasks "a" as a simple "XOR" or "AND" gate. A recursive scheme may be used to detect and represent the complex input/output combinations.

More particularly, let "O" be set of all outgoing edges of a task. Partition "O" into "k" subsets "O1, O2 ... Ok" such that there is a "XOR" or "AND" relation between the subsets. For example in FIG. 5A-B, set of all outgoing edge is "O={e, d, c, b}" and partition it into three sets, "O1={c, b}", "O2={d}", "O3={e}", with "XOR" relation.

Attempt to partition set "O" into subsets with "XOR" relation. If successful, then mark output of the task as "XOR" and add an invisible task to each cluster with more than one member. FIG. 5B shows how the output gate of the node "a" is marked as "XOR" 501 and invisible node "f" 502 is added.

To find such a partition, start with an empty partition O. Next, randomly choose an edge, t, from "O" and remove it from "O"; if "t" is not parallel with any of the nodes in partition O then add the single subset {t} to the partition sets. If "t" is parallel with one of nodes in a subset in O then add "t" to that subset. This procedure may be repeated until O is empty. Finally, check that there are no two parallel tasks in two different sets of the partition. The pseudo code of the algorithm is depicted below.

---

Algorithm 1: Partitioning the output set into "XOR" subsets

Input:
    1-O: set of outgoing edges
    2-Set of parallel tasks
Output: a partition on O with "XOR" relation between the subsets
    I-   Set O = φ
    II-  While O ≠ φ
        a.  t ← a random element of O
        b.  O ⇐ O\{t}
        c.  If "t is not parallel with any r ∈ $O_l$ ∈ O" then O ⇐ O∪{{t}}
        d.  If "∃$O_k$ ∈ O such that t is parallel with at least one member of $O_k$" then $O_k$ ⇐ $O_k$ ∪{t}
    III- If ∀t ∈ $O_k$, r ∈ $O_l$  l ≠ k, task "t" is not parallel with task "r" then return O as the final partition; else return FAIL

---

FIG. 6 is an exemplary output of Algorithm 1 given the process model shown in FIG. 3.

If set "O" cannot be partitioned into subsets with "XOR" relation, then try the "AND" relation. Finding partitions with "AND" relation between the subsets is similar to the previous algorithm and can be found in Algorithm 2.

---

Algorithm 2: Partitioning the output set into "AND" subsets

Input:
    1-O: set of outgoing edges
    2-Set of parallel tasks
Output: a partition on O with "AND" relation between the subsets
    I-Set O = φ
    II-While O ≠ φ
        a.  t ← a random element of O
        b.  O ⇐ O\{t}
        c.  If "t is parallel with any r ∈ $O_l$ ∈ O" then O ⇐ O∪{{t}}
        d.  If "∃$O_k$ ∈ O such that t is not parallel with at least one member of $O_k$" then $O_k$ ⇐ $O_k$ ∪{t}
    III-If ∀t ∈ $O_k$, r ∈ $O_l$  l ≠ k, task "t" is parallel with task "r" then return O as the final partition; else return FAIL

---

Note that in the above algorithms, a random element of the set "O" is selected. Following a predefined order for selecting elements of "O" may result in failure in both "AND" and "XOR" detection algorithms.

Algorithms 1 and 2 may be applied to all of the nodes with more than one outgoing edges. Algorithm 3 shows how to use Algorithms 1 and 2 to determine output gates of all nodes.

---

Algorithm 3: Determining output gates of all nodes

I-  While "there is a node with undetermined output gate and more than 1 outgoing edges"
    a.  a = a node with undetermined output gate and more than 1 outgoing edges
    b.  Partition the output set of "a" into "XOR" subsets (Algorithm 1)
    c.  If (I.a) return a partition with more than one set, mark output gate of "a" as "XOR" and add new task for each partition with more than one element
    d.  If (I.a) fails, partition the output set of "a" into "AND" subsets (Algorithm 2)
    e.  If (II.a) return a partition with more than one set, mark output gate of "a" as "AND" and add new task for each partition with more than one element
    f.  If #iteration > THRESHOLD then RETURN FAIL

---

Algorithms 1 and 2 can be applied to identify parallel versus exclusive joins in the process model if their input set is changed to set of all incoming edges. Given the probabilistic graph, decision nodes may be treated separately. Given the document-driven nature of case executions, the contents of the documents (e.g., case files containing customer order details) that a user currently has access to (block 109) in a case management system may affect the outcome (e.g., future activities) of the activity they are currently involved in.

Case history (109) may be leveraged to understand the likelihood of different outcomes at specific points in a case's execution, and how the contents of documents influence the decisions made at these points.

Assume a case with some documents associated to it (documents may be empty). A decision tree is fit to each decision node 104. Based on the decision tree output, update PPM 105. Since the resulting PPM is not a Markov Chain (MC), it is not possible to use available techniques to predict the future of the case. Construct an extended Markov Chain based on PPM and use the extended Markov Chain for prediction 106.

Figure 7:
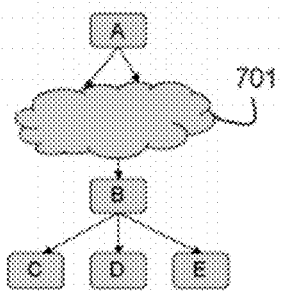
FIG. 7 illustrates fitting a decision tree to each decision point according to an embodiment of the present disclosure.

More particularly, in block 104 of FIG. 1, assume, for a specific case, state (task) "a" that state "b" is an arbitrary decision point in the PPM (FIG. 7). Based on the available case documents 701 at "a", learn a decision tree (DT) for output of node "b" (e.g., using a C4.5 algorithm). Assume that, based on the case documents 109, decision tree (DT) predicts that "c" from "b". This prediction may not be 100% true and in practice, the process may go from "b" to "d". Based on the Table 1 (given by J48) if decision tree (DT) predicts "c" from "b", then with probability of 0.81, a process proceeds to "c" with "d" and E having probabilities of 0.14 and 0.05, respectively.

TABLE 1

|  | C | D | E |
|---|---|---|---|
| DT predicts "c" | 81% | 14% | 5% |
| DT predicts "d" | 10% | 70% | 20% |
| DT predicts "e" | 3% | 6% | 91% |

The above procedure explains how to update the probabilities on the PPM. An updated PPM may be based on the available documents at the moment.

There exist well-known methods for learning a decision tree from the dataset, for example, the C4.5 algorithm. C4.5 algorithm recursively chooses attributes for the nodes of the tree such that (normalized) entropy of the classes ("y") in divided sets is minimized.

Decision tree learning algorithms such as C4.5 can identify important attributes of the dataset. They put important attributes (in terms of classification) in higher lever nodes of the tree and they ignore irrelevant attributes. Thus, if case history includes many documents that are irrelevant for a specific decision point in the process model, the irrelevant documents are simply ignored and complexity of the system would be reduced significantly.

Referring to block 106, a method may predict the probability that task "e" will be done in future if task "c" is done. Since the PPM is not a Markov Chain, the question may not be meaningful.

Figure 8:
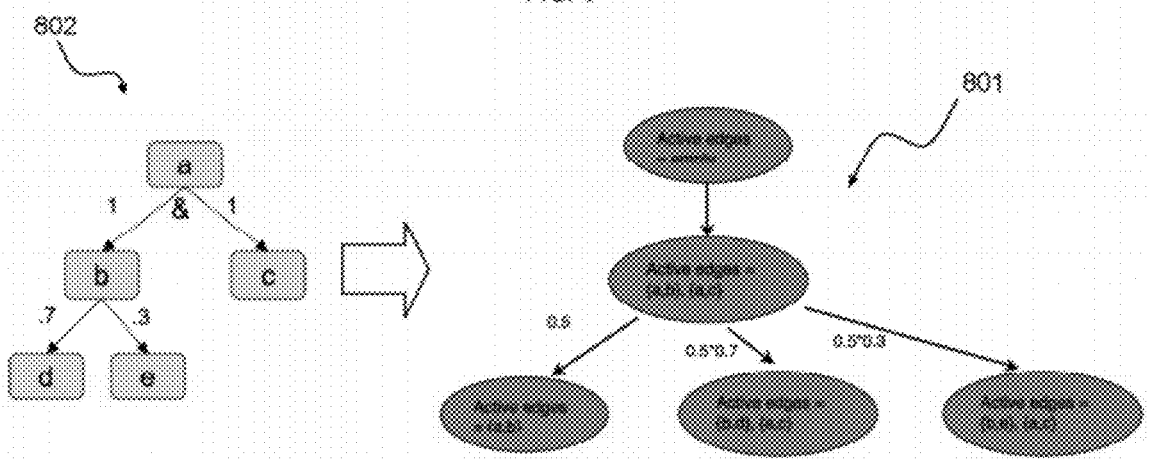
FIG. 8 illustrates extending a Probabilistic Process Model to a Markov Chain according to an embodiment of the present disclosure.

For example, consider a PPM as given in FIG. 8 and two cases: (1) abc, and (2) abdc. Here, one may wish to predict whether "d" happens after "c". Based on FIG. 8, in case (1), "d" occurs after "c" with a probability of 0.7. In case (2) it is not possible to visit "d" after "c". To alleviate this problem, an extended Markov Chain 801 is constructed based on the given PPM 802. The Markov Chain describes relations between different states of the case. Using an extended Markov Chain, the probability that each task will be done in future may be predicted.

Assigning probabilities to decision nodes: When there is an in-execution case and it is not complete, the future tasks that will be executed depend on the decision points in the process model. Thus, for a given case instance, a probability of taking each possible path after the decision point should be estimated.

Let task "a" be a decision point, a task with "XOR" in the output gate, and tasks "b" or "c" follow after "a"; predict a probability of executing "b" and "c" after "a". Here, note that transition probabilities depend on the available documents of the case instance.

Figure 9:
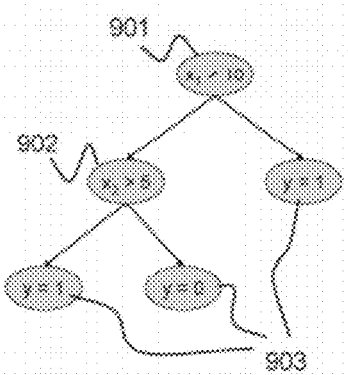
FIG. 9 is an exemplary decision tree according to an embodiment of the present disclosure.

Decision trees are well known classification methods in the machine learning literature. Assume you want to classify a data set with variables (attributes) $(x_1, x_2 \ldots x_n)$. The training data set has the form of $(x_1, x_2 \ldots x_n, y)$; where "y" is class of the instance. The goal is to classify instance $(x_1, x_2 \ldots x_n)$ based on the training dataset. Decision trees provide a classification method that each node represents a condition on one variable. For a given instance $(x_1, x_2 \ldots x_n)$, one should start from the root node and traverse the tree based on conditions at each node until he/she reaches a leaf FIG. 9 is an example of a decision tree; values of x1 901 and x2 902 determine class of the instance (y) 903.

There are well-known methods for learning a decision tree from the dataset, for example, the C4.5 algorithm. C4.5 algorithm recursively chooses attributes for the nodes of the tree such that (normalized) entropy of the classes ("y") in divided sets is minimized.

Decision tree learning algorithms such as C4.5 can identify important attributes of the dataset. They put important attributes (in terms of classification) in higher lever nodes of the tree and they ignore irrelevant attributes. Thus, if case history includes many documents that are irrelevant for a specific decision point in the process model, the irrelevant documents are simply ignored and complexity of the system would be reduced significantly.

Execution of a case involves many nondeterministic factors such as human decisions, unknown documents, and unknown facts about the case; thus, it might not be possible to fit exact decision trees to decision points. In the other word, decision trees learned based on the case history would not always be able to predict the correct outcome. However, for a given case instance, a probability distribution over possible outcomes can be inferred form the decision tree. These distributions may be used for obtaining a PPM that is case specific.

Note that decision trees are learned based on the case history and they do not change in the next steps. However, for each case instance (dataset), a specific probability distribution can be inferred from the decision trees.

Decision trees are just learned at the decision points of the process model (tasks in the process model with XOR gate in the output gate). There is no choice in the tasks with "AND" output gate; all the subsequent talks should be executed.

Referring to block 106 of FIG. 1, the PPM includes parallel tasks. The mined PPM can be transformed to a Markov chain. The Markov chain with an extended state space can be decomposed to smaller Markov chains.

Figure 10:
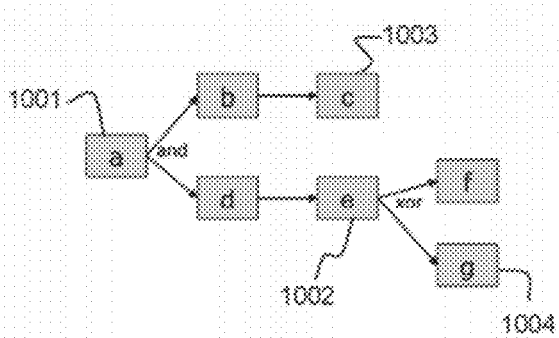
FIG. 10 is a process model with parallel tasks according to an embodiment of the present disclosure.

For example, consider the example in FIG. 10. In FIG. 10, output gate of the task "a" 1001 is "AND" and output gate of the task "e" 1002 is "XOR". Assume two traces "abdc" and "abdefc" have been observed; the question is "would task 'g' be executed?" The last task in both traces is "c" 1003; task "g" 1004 may be executed after task "c" in the first trace but it is not possible that it be executed after task "c" in the second trace. Thus, the state of the trace is not only function of its last executed task but also depends on the path it is taken by the trace.

To define the state space of the Markov chain, assume each edge can be labeled as active (1) and inactive (0). Assume $E \subset V \times V$ is set of edges in the PPM. Then, there are $2^{|E|}$ possible labels for all the edges.

Now, define state of the in-execution task in the PPM by the active edge. All edges by default are inactive. If a task is executed and the output gate is "AND", then all the output edges are activated. Similarly, if a task is executed and the output gate is "XOR" then only one of the output edges is activated. A task is active (or can be executed) if the input gate is "AND" and all the input edges are active or the input gate is "XOR" and one of the input edges is active. The state of the case is defined by active and inactive edges. Thus, the size of state space can be as large as $2^{|E|}$.

However, not all the states are reachable from the starting point of the process model and practically the reachable states are much smaller than potential size of the state space $2^{|E|}$. Also, state space can be decomposed to smaller state spaces.

Transitions among various states can be defined appropriately. There is a transition from states $s_1 \in 2^{|E|}$ to state $s_2 \in 2^{|E|}$, if state $s_2$ can be obtained by executing an active task, "a", in state $s_1$. Note that if the output of the task "a" is "XOR", executing task "a" will activate one of the outgoing edges. Let $p_i$ be the probability of activating the particular edge that transforms $s_1$ to $s_2$. Then, the transition probability between these states would be $$\frac{1}{m} p_i;$$

where "m" is the number of active tasks in state $s_1$.

Algorithm 4: reachable_states(state s):
Finding reachable state in a process model Input: a state s
Output: set of reachable states
I-    S = ϕ
II-   For all active tasks "a" in s
      a.   Execute "a" and get new state "s0"
      b.   S = S ∪ {s_0} ∪ reachable_state(s0)

Referring to block 107 of FIG. 1, Kolmogorov backward equations may be used for prediction 108.

Having the Markov Chain with extended space, a probability of executing each task for a given in-execution case may be predicted 108.

Consider the extended state space Markov Chain (eMC). Let "S" be set of reachable states and T be the transition matrix; i.e., $T_{s,t}$ is probability of going from state "s" to "t". Since the eMC models a business process, it has an end state "e" (there is no out going edge from "e" to any other state). Also, assume "A" is a given subset of "S" such that $e \notin A$. Define $g: S \rightarrow [0,1]$ as follows.

g(s)=probability of visiting A starting from state "s".

By definition, $g(s)=1, \forall s \in A$ and since "e" is the end state, it is not possible to go to A from e; thus, $g(e)=0$.

For other states $s \in S \setminus A \setminus \{e\}$, g(s) may be written as a linear combination of "g" over other states.

$$g(s) = \sum_{\hat{s} \in S} T(s, \hat{s}) g(\hat{s})$$

There are a total of n=|S| equations and "n" variables (g(s)), thus it is possible to compute g(s) exactly by solving following system of linear equation.

$$\begin{cases} g(s) = 1, \forall s \in A \\ g(e) = 0 \\ g(s) = \sum_{\hat{s} \in S} T(s, \hat{s}) g(\hat{s}) \end{cases} \quad (1)$$

Now, assume the probability of executing task "a" is to be determined. Since it may be assumed that a process once begun always completes, task "a" would be executed until completion if it ever gets activated. Thus, define set "A" as follows.

$A = \{s \in S | \text{task "a" is active in state "s"}\}$.

Now, the probability of executing task "a" starting from each state can be computed using Eq. (1).

It may be assumed that the training data set (completed traces log) is fixed; however, in a practical system, new traces may be added to the system over time. Thus, an updating rule may be implemented such that the predictions are updated as new traces come in. It should also be noted that the update methods described herein are applicable to both the PPM and the decision nodes. Thus, in a case where only the PPM is determined, the update methods may still be applied.

Figure 11:
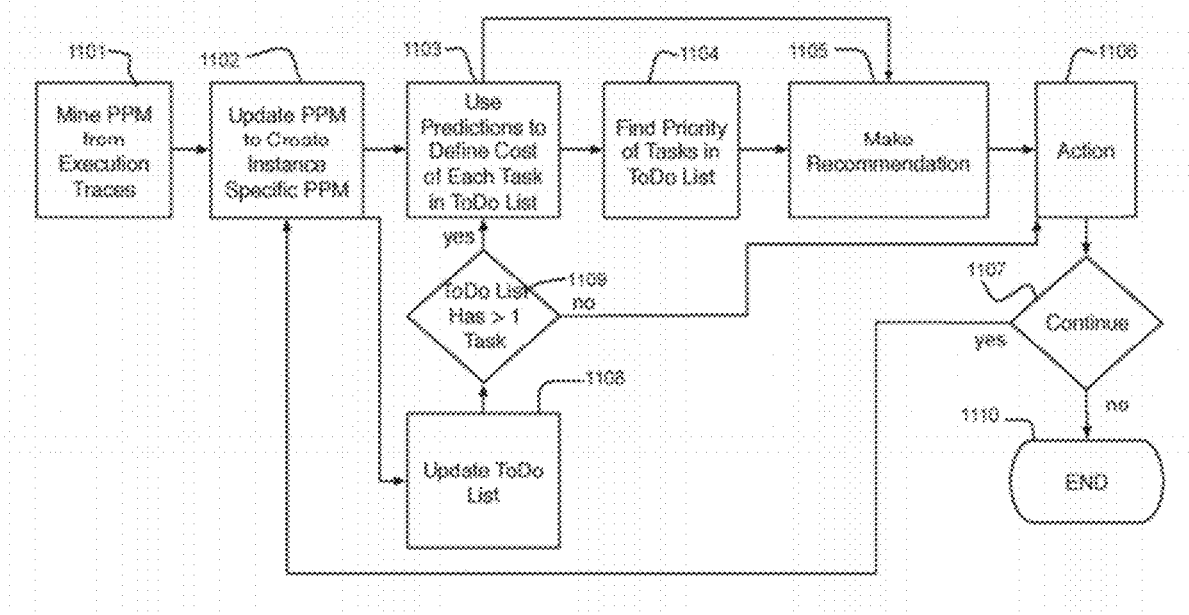
FIG. 11 is a flow diagram of a recommender system according to an embodiment of the present disclosure.

According to an exemplary embodiment of the present disclosure, a prediction may be generated from a PPM. It may be understood that a state of a case is a function of previously executed tasks and available documents. FIG. 11 shows an exemplary method for a task recommendation. In FIG. 11, the PPM is minded from execution traces (1101) and an instance specific PPM is created 1102 as described with reference to FIG. 1. The predictions 108 are used to define a cost of each task in a todo list 1103. That is, a case-worker may have a set of tasks organized in a todo list. Costs may be defined for each task and a priority of tasks in the todo list is determined 1104. A recommendation of a next task to perform 1105 is determined from the prioritized tasks, e.g., recommending action on a highest priority task. Here, any parallel tasks may be indicated to the case-worker. The case-worker takes an action to perform a task 1106. If at least one task remains 1107, the instance specific PPM is updated 1102 in view of the action 1106, otherwise the method may end 1110. Assuming that at least one task remains, the PPM and the todo list may be updated 1102 and 1108, e.g., tasks performed by the case-worker are removed from the todo list. Assuming the todo includes more than one task after the update (block 1109 is evaluated), new costs are determined for each task 1103, otherwise, the last task is indicated to the case-worker for action 1106 and the routine may end 1110.

More particularly, a Stochastic system may be defined by a set of states, S, a set of tasks, A, a mapping from states to tasks, $A: S \rightarrow A$, and a mapping from state-actions to probability distribution functions over the states, $P: A \times S \rightarrow P$. For simplicity, we denote the s'-th element of P(a, s) by P(a, s').

For $s \in S$, A(s) represents set of all possible tasks at state s; and $P_a(a, s')$ is the probability of going from state s to state s' if task $a \in A(s)$ is performed. A policy π is a mapping from states to possible tasks. That is, for $s \in S$, $\pi(s) \in A(s)$. The policy determines which tasks should be done at each state. In state s, taking task a∈A(s) costs $g_a(s)$. Assume a state s and a policy π. Let $J_π(s)$ be total cost of policy π starting from state s. This problem may be expressed as a Bellman equation, recursive step-by-step faun with a value function in one period and a value function in the next period:

$$J_\pi(s) = g_{a=\pi(s)}(s) + \sum_{s' \in S} P_{a=\pi(s)}(s, s') J_\pi(s')$$

The first term is the cost of performing tasks a in state s. The second term represents the future cost. Given state s and a chosen task a, then go to state s' with probability P(s, s'). J is the future cost function. The future cost in state s' is J(s') (1103).

An optimal policy (1104) may be defined as:

$$\pi^* = \mathrm{argmin}_\pi J_\pi$$

An optimal policy may be determined by various algorithms such as value iteration, policy iteration, linear programming, etc.

The state space S is set of all possible states of a case. Set of all tasks for a state, A(s), is the todo list of a case worker.

Transition probabilities, in other words, P(s, s'), where s is one state and s' is another state, can be defined based on the transitions in the case state space. Transition probabilities can be learned from mining previous trace logs and determined as described above.

A policy is a mapping from states to a task in the todo list; e.g., a recommendation for executing a task from the todo list such that total cost of the case is minimized. Thus, dynamic programming algorithms may be used to find an optimal policy, that is an optimal task recommendation from the todo list (1105).

For a process that is totally structured, comprising only serial and parallel tasks, the cost minimization is irrelevant. That is, there is no preference on the order of the todo list. All possible orders of executing the todo list have the same cost.

It is to be understood that embodiments of the present disclosure may be implemented in various forms of hardware, software, firmware, special purpose processors, or a combination thereof. In one embodiment, a method for predictive analytics for document content driven processes may be implemented in software as an application program tangibly embodied on a computer readable medium. As such the application program is embodied on a non-transitory tangible media. The application program may be uploaded to, and executed by, a processor comprising any suitable architecture.

Referring to FIG. 12, according to an embodiment of the present disclosure, a computer system 1001 for generating predictions from a PPM can comprise, inter alia, a central processing unit (CPU) 1202, a memory 1203 and an input/output (I/O) interface 1204. The computer system 1201 is generally coupled through the I/O interface 1204 to a display 1205 and various input devices 1206 such as a mouse and keyboard. The support circuits can include circuits such as cache, power supplies, clock circuits, and a communications bus. The memory 1203 can include random access memory (RAM), read only memory (ROM), disk drive, tape drive, etc., or a combination thereof. The present invention can be implemented as a routine 1207 that is stored in memory 1203 and executed by the CPU 1202 to process the signal from the signal source 1208. As such, the computer system 1201 is a general-purpose computer system that becomes a specific purpose computer system when executing the routine 1207 of the present invention.

The computer platform 1201 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for generating predictions from a PPM, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A computer implemented iterative method for predictive analytics in a semi-structured process comprising:
updating, iteratively, at least one probability of a probabilistic process model for the semi-structured process based on a completed task, wherein updating the at least one probability of the probabilistic process model comprises:
identifying a present state within the semi-structured process;
deriving, from a process policy of the semi-structured process, a set of tasks, of a plurality of tasks associated with the probabilistic process model, that can be performed, at the identified present state, in conforming to the semi-structured process;
establishing a todo list including the set of tasks that can be presently performed;
defining a cost of each of a plurality of tasks of the todo list;
prioritizing the plurality of tasks of the todo list according to the defined costs; and
recommending a next task from the todo list according to the prioritization.

2. The method of claim 1, further comprising updating the todo list by one of adding a new task to the todo list and removing the completed task from the todo list.

3. The method of claim 1, further comprising updating the todo list by removing another task from the todo list.

4. The method of claim 1, wherein updating the at least one probability of the probabilistic process model comprises updating at least one value of document content corresponding to nodes in the probabilistic process model.

5. The computer readable storage medium of claim 1, further comprising updating a current state to reflect the probabilistic process model in view of the completed task.

6. The computer readable storage medium of claim 1, wherein defining the cost further comprises: determining a total cost of a policy from a current state including a current cost function and a future cost function; and determining a transition probability between the current state and a future state.

7. A computer readable storage medium embodying instructions executed by a processor for performing an iterative method for predictive analytics in a semi-structured process, the method comprising:
- updating, iteratively, at least one probability of a probabilistic process model for the semi-structured process based on a completed task, wherein updating the at least one probability of the probabilistic process model comprises:
- receiving the probabilistic process model;
- identifying a present state within the semi-structured process;
- deriving, from a process policy of the semi-structured process, a set of tasks, of a plurality of tasks associated with the probabilistic process model, that can be performed, at the identified present state, in conforming to the semi-structured process;
- establishing a todo list including the set of tasks that can be presently performed;
- defining a cost of each of the plurality of tasks of the todo list;
- prioritizing the plurality of tasks of the todo list according to the defined costs; and
- recommending a next task from the todo list according to the prioritization.

8. The computer readable storage medium of claim 7, wherein updating the at least one probability of the probabilistic process model comprises updating the todo list including the plurality of tasks.

9. The computer readable storage medium of claim 8, wherein updating the todo list comprises one of adding a new task to the todo list and removing the completed task from the todo list.

10. The computer readable storage medium of claim 8, wherein updating the todo list including the plurality of tasks further comprises removing another task from the todo list.

11. The computer readable storage medium of claim 7, wherein updating the at least one probability of the probabilistic process model comprises updating at least one value of document content corresponding to nodes in the probabilistic process model.

12. The computer readable storage medium of claim 7, further comprising updating a current state to reflect the probabilistic process model in view of the completed task.

13. The computer readable storage medium of claim 7, wherein defining the cost further comprises: determining a total cost of a policy from a current state including a current cost function and a future cost function.

14. The computer readable storage medium of claim 13, further comprising determining a transition probability between the current state and a future state.

15. A non-transitory computer readable storage medium embodying instructions executed by a processor for predictive analytics in a semi-structured process, the method comprising:
- updating a probabilistic process model associated with a plurality of tasks of the semi- structured process upon a task of the plurality of tasks being completed, wherein the completed task is removed from the plurality of tasks of the semi-structured process;
- identifying a present state within the semi-structured process;
- deriving, from a process policy of the semi-structured process, a set of tasks, of the plurality of tasks that can be performed, at the identified present state, in conforming to the semi-structured process;
- establishing a todo list including the set of tasks that can be presently performed of remaining tasks of the plurality of tasks;
- defining costs of tasks of the todo list based on a prediction of an updated probabilistic process model;
- prioritizing that remaining tasks of the todo list according to the defined costs; and
- recommending a next task from the remaining tasks of the todo list according to a prioritization.

16. The computer readable storage medium of claim 15, further comprising iteratively recommending ones of the remaining tasks upon completion of each task.

17. The computer readable storage medium of claim 16, further comprising removing completed tasks from the plurality of tasks.

18. The computer readable storage medium of claim 15, wherein defining the cost further comprises: determining a total cost of a policy from a current state including a current cost function and a future cost function.

19. The computer readable storage medium of claim 18, further comprising determining a transition probability between the current state and a future state.

20. A computer readable storage medium embodying instructions executed by a processor for performing an iterative method for predictive analytics in a semi-structured process, the method comprising:
- updating, iteratively, at least one probability of a probabilistic process model for the semi-structured process based on a completed task, wherein updating the at least one probability of the probabilistic process model comprises:
- receiving the probabilistic process model;
- identifying a present state within the semi-structured process;
- deriving, from a process policy of the semi-structured process, a set of tasks, of a plurality of tasks associated with the probabilistic process model, that can be performed, at the identified present state, in conforming to the semi-structured process;
- establishing a todo list including the set of tasks that can be presently performed;
- defining a cost of each of the plurality of tasks of the todo list;
- prioritizing the plurality of tasks of the todo list according to the defined costs;
- determining an exception to the todo list; and
- recommending a task from a general list according to the exception.

21. The computer readable storage medium of claim 20, further comprising updating the todo list including the plurality of tasks, wherein updating the todo list comprises one of adding a new task to the todo list and removing the completed task from the todo list.

22. The computer readable storage medium of claim 20, further comprising updating the todo list including the plurality of tasks, wherein updating the todo list including the plurality of tasks further comprises removing another task from the todo list.

23. The computer readable storage medium of claim 20, wherein updating the at least one probability of the probabilistic process model comprises updating at least one value of document content corresponding to nodes in the probabilistic process model.

24. The computer readable storage medium of claim 20, further comprising updating a current state to reflect the probabilistic process model in view of the exception.

25. The computer readable storage medium of claim 20, wherein defining the cost further comprises: determining a total cost of a policy from a current state including a current cost function and a future cost function; and determining a transition probability between the current state and a future state.

* * * * *